United States Patent
Singanamala

(10) Patent No.: US 8,180,048 B2
(45) Date of Patent: May 15, 2012

(54) METHOD AND SYSTEM FOR COMPUTATIONAL TRANSFORMATION

(75) Inventor: Prahlad P Singanamala, Karnataka (IN)

(73) Assignee: Prahlad P. Singanamala, Bangalore, Karnataka (IN)

( * ) Notice: Subject to any disclaimer, the term of this patent is extended or adjusted under 35 U.S.C. 154(b) by 561 days.

(21) Appl. No.: 11/572,635

(22) PCT Filed: Sep. 14, 2004

(86) PCT No.: PCT/IN2004/000287
§ 371 (c)(1),
(2), (4) Date: Jan. 25, 2007

(87) PCT Pub. No.: WO2006/030447
PCT Pub. Date: Mar. 23, 2006

(65) Prior Publication Data
US 2007/0195952 A1    Aug. 23, 2007

(51) Int. Cl.
*H04L 9/06* (2006.01)
*H04L 9/16* (2006.01)

(52) U.S. Cl. ............... 380/44; 380/27; 380/37; 380/42; 380/43; 380/46; 713/189; 713/193

(58) Field of Classification Search ............ 380/37, 380/28, 42
See application file for complete search history.

(56) References Cited

U.S. PATENT DOCUMENTS

| | | | | |
|---|---|---|---|---|
| 4,078,152 A | * | 3/1978 | Tuckerman, III | 380/37 |
| 4,979,832 A | * | 12/1990 | Ritter | 380/28 |
| 6,937,727 B2 | * | 8/2005 | Yup et al. | 380/37 |

(Continued)

OTHER PUBLICATIONS

Sen, S.; Hossain, S. I.; Islam, K.; Chowdhuri, D.R.; Chaudhuri, P.P.; "Cryptosystem designed for embedded system security," VLSI Design, 2003. Proceedings. 16th International Conference on, vol., No., pp. 271-276, Jan. 4-8, 2003.*

(Continued)

*Primary Examiner* — Jeffrey D Popham
*Assistant Examiner* — Alexander Lagor
(74) *Attorney, Agent, or Firm* — Prakash Nama; Global IP Services, PLLC

(57) ABSTRACT

The invention generally relates to computational transformation process, which has applications in cryptography, random number generation, hash code generation etc. The computational transformation module uses a keyset, which is designed using a two dimensional array. Since the process of forward transformation used in the invention is a symmetric encryption process and if used to send data securely over a communications network, the same keyset needs to be present at the sending computer to encrypt the data and the receiving computer to go through a reverse transformation and decrypt the data. When the first 'n' bit block of input-data is transformed into the first 'm' bit block of output-data, the keyset is transformed into a different keyset based on a nonlinear or one-way transformation on the keyset. The next input block is encrypted using a transformed keyset, hence satisfying Shanons theory of perfect secrecy. It uses the same logic with additional parameters and operations to create random numbers and unique hash codes. The computational transformation process is a one-way process which is based on a principle where given the input value 'x', it is easy to transform 'x' to 'y' using a function 'F' i.e. F(x)=y. However, given 'y' in the range of F, it is hard to find an x such that F(x)=y. In this system, the same transformation function and same keyset is used for both encryption as well as decryption with only a change in the constant value.

49 Claims, 15 Drawing Sheets

U.S. PATENT DOCUMENTS

| | | | |
|---|---|---|---|
| 7,016,497 B2 * | 3/2006 | Henson et al. | 380/277 |
| 2002/0071552 A1 * | 6/2002 | Rogaway | 380/37 |
| 2006/0177052 A1 * | 8/2006 | Hubert | 380/29 |

OTHER PUBLICATIONS

Dynamic Generation of S-Boxes in Block Cipher Systems ProfDr. S. H. EL-Ramly, Dr. Talaat EL-GarP, & Msc. Eng. A. H. Soliman Eighteenth National Radio SCkENCE Conference Mar. 27-29, 2001,Mansoum Univ., Egypt p. 389-397.*

Data Encryption Standard (DES) federal information processing standards publication 46-2 Dec. 30, 1993.*

Cormen, T. H. "Introduction to Algorithms", p. 101, MIT Press, 2001.*

Data Encryption Standard (DES), Federal Information Processing Standards Publication 46-2, Feb. 1988.*

Schneier, B., "Applie Cryptography", 1996, John Wiley & Sons, 2nd Edition, p. 193-194.*

* cited by examiner

METHOD AND SYSTEM FOR COMPUTATIONAL TRANSFORMATION

RELATED APPLICATION DATA

This application is a complete patent application in relation of International Patent Application Serial No. PCT/IN2004/000287 filed on Sep. 14, 2006 entitled "A Method and System for Computational Transformation".

FIELD OF THE INVENTION

The invention relates generally to the field of cryptography. In particular, the invention relates to a method and system for symmetric encryption and decryption, random number generation and hash code generators using a true one-way function.

BACKGROUND OF THE INVENTION

The present invention pertains to cryptographic communications and methods, to provide secure communication over a communications channel and to store data securely on a computing system. With the advent of computer technology and networking methods in information technology, information is made available within no time across the globe. There are various information intensive businesses that have developed and have thrived on information technology.

Communication of right information at a fast rate is highly necessary for various business fields, Banking, Electronic Mails, Data Processing and Strategic Consultancy just to name a few. Secure electronic communication is centric to almost all business forms and business units existing in this age of Information technology. While the information flow through the existing electronic communications channel is becoming faster by the day, this data is susceptible to monitoring by electronic eavesdroppers. Furthermore, issues like authentication of the source of electronic data sent over a communications channel and its verification also need to be addressed to control potential forgery of electronic signatures which can have adverse effects on transactions such as a bank draft or securities deposit wherein the signature has to be verified to ensure that the document has come from the assigned signatory and is not a fake. This highlights the need of having a secure communications channel that can provide security to the communicated data from electronic eavesdroppers as well as act as the true authentication for electronic signatures on transaction documents.

There have been cryptographic systems for secure transmission, authentication and verification of sent electronic data over a communications channel but each of them applied till date has had certain shortcomings. There have been asymmetric as well as symmetric encryption systems. All these cryptographic encoding and decoding methods ensure some degree of protection, privacy.

Symmetric encryption uses algorithms where the same keyset is used for both the encryption as well as the decryption process. The key generated must be kept secret, and is shared by the message sender and recipient. For example, a password used in a Microsoft Word document uses symmetric encryption techniques where the password used to encrypt and decrypt the file is the same and is used to secure the file from eves droppers. The person encrypting the file with a password must inform the receiver of the password, either physically or through any other means, in order for the receiver to be able to decrypt the file.

Symmetric key encryptions can be divided into stream ciphers and block ciphers. Stream ciphers encrypt the bits of the message one at a time, and block ciphers take a number of bits and encrypt them as a single unit. Typically, blocks of 64 bits are used. Symmetric-key algorithms are generally much faster to execute than asymmetric encryption algorithms. However, symmetric-key algorithms do have certain pitfalls. One being the requirement of a shared secret key with one copy at the sender and receivers end. Since keys are subject to discovery by a cryptographic adversary, they need to be changed often and kept secure during distribution and service. An alternative to this is the use of asymmetric encryption to encrypt data or to transfer the password and then carry out symmetric encryption.

One of the first cryptographic communications method to be used were the data encryption standards tools adopted by the National Bureau of Standards, Federal Register, Mar. 17, 1975, Volume 40, No. 52 and Aug. 1, 1975, Vol. 40, No. 149.

A cryptographic communications channel normally comprises of an encryption system and a decryption system coupled to the communications channel. The message is encrypted using the encryption system at one end of the communications channel and sending it across the communication channel where it is decoded by the decryption channel at the other end of the channel. For digital systems, the message is defined to be a digital message represented by numerical characters, these characters, generally being the Binary notation characters of 0 and 1. The cryptographic systems in use essentially highlight the use of an encoding key or operator, K, on the digital message that is to be encoded, M, and encode the message M onto the encoded version E, where, K and E are also digital sequences of numerical characters, represented in the same notation as M. Thus, the encrypting device takes as input, M and K, and then operates on M using K and encrypts it into E.

The decrypting device, on the other hand takes E and the decrypting key or operator K' as the input, operates on E using K' and decrypt it into the deciphered text M'. Where, K' and M' are also digital sequences of numerical characters, represented in the same notation as M. Here, the digital sequence of the encrypting and decrypting keys, or operators i.e. K and K' are so chosen that M'=M.

In the available literature on cryptographic systems, for instance, Public key cryptosystems as described by Diffie and Hellman in "New directions in cryptography", IEEE Transactions on Information Theory (November 1976), much is talked about the use of Public and private keys to encipher the data to be communicated and also to decipher it. The methodology of cryptography presented in the above-cited literature by Diffie and Hellman emphasizes on the use of a public key (KP) to encrypt the message M. To decrypt the message from the cipher-text E; the private key KPr is used.

The public and the private keys are so selected that M'=M. The public key (KP) is available on the public file system of the user, whereas the private key (KPr) remains with the user. Whenever, a user B has to send an encrypted message to user A, the message M is encrypted using the public key of user A. User A then decrypts the encrypted message using the private key which is known only to user A. This method is further employed to act as the authorization on electronic signatures. To successfully implement the Diffie and Hellman method described above, it is absolutely essential to make a judicious selection of the private key, as this selection would determine the vulnerability of the encrypted message to eavesdroppers. The selected key should be computationally difficult to compute. However, there would always exist brute force methods to compute the private key of a user, one such method being listing of all possible messages M until one such M where KP(M)=E and then KPr can be computed using KPr (E)=M.

The RSA patent, U.S. Pat. No. 4,405,829, has employed a scheme to generate the private key for the user based on prime number factorization to make the computation of the private key by eavesdroppers computationally much difficult (computationally expensive process). The RSA method of encrypting and decrypting employs the same public and private key concepts as mentioned in the Diffie and Hellman system to encrypt and decrypt a message. The operations performed onto the message to encrypt the message into a cipher-text involve the representation of the message as a number equivalent wherein the number equivalent is a non-negative number less than a composite number n which has two prime number factors i.e. $n=p \cdot q$, where p and q are prime numbers.

These existing systems however, do not offer full security from eavesdroppers, as although they involve the computation of the private key required to decipher an encrypted message, which is extremely difficult as it involves the computation of prime numbers at different stages and as the size of the number, whose prime factors are to be found, increases, the process becomes more and more expensive. However, with the advent of supercomputers and high speed computing, finding prime number algorithms can be implemented much faster and hence the encrypted messages can be decrypted, obstructed and forged by eavesdroppers. More so, these encryption-decryption modules involve a public key which is available to all, the task is to generate the private key which is only with the user.

Also, as per Shannon's theory of perfect secrecy or unknown condition, in order for a cipher to be unbreakable, the keyset required to encipher it should be unique for every message and the length of the keyset should be greater than or equal to the length of the message to be communicated. No method of encrypted communication can be totally secure until it employs the above-mentioned scheme.

The proposed system and method hopes to overcome all the shortcomings of the existing technologies to provide a full-proof unbreakable symmetric key encryption. The system and method is also used to address the needs for generating random numbers and unique hash codes.

BRIEF DESCRIPTION OF THE DRAWINGS

Many of the objects and advantages of the present invention will become apparent to those of ordinary skill in the relevant art after reviewing the following detailed description and accompanying drawings, wherein.

DETAILED DESCRIPTION OF THE INVENTION

Figure 1:
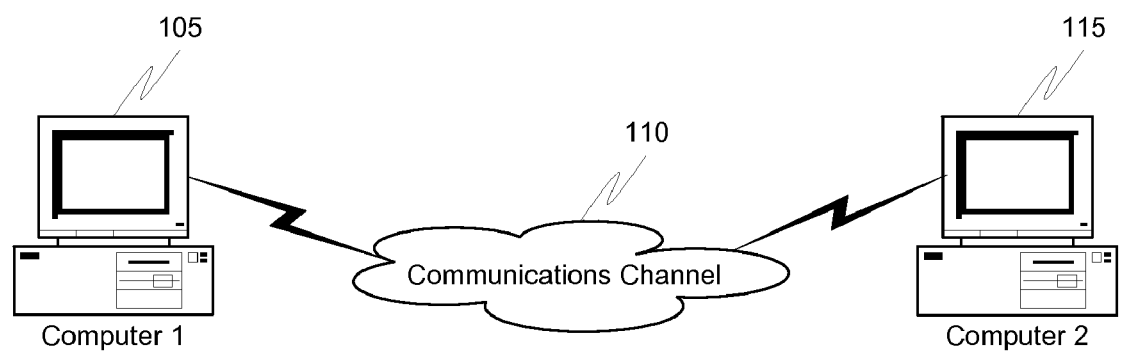
FIG. 1 shows a block diagram of a communications channel.

The present invention may be embodied in several forms, structures and manners. The description provided below and the drawings show an exemplary embodiment of the invention. Those of skill in the art will appreciate that the invention may be embodied in other forms, structures and manners not shown below. The invention shall have the full scope of the claims and is not to be limited by the embodiments shown below.

One of the embodiments of the forward transformation and reverse transformation is the process of encryption and decryption respectively. Encryption and decryption is an inevitable process for transmitting data securely over a communications channel and also used to store data or information securely on a computing system. Several existing technologies for encryption and decryption have been described in the background of the invention. However, the current invention addresses and overcomes the core problem in earlier and current encryption mechanisms and technologies.

The present invention makes use of a true one-way process for forward transformation as well as reverse transformation i.e. to encrypt as well as decrypt data in an embodiment of the invention. True one-way functions are such that, given an input 'x' it is easy to compute an F(x) and obtain 'y' where F(x)=y and F is a one-way function. However, in spite of knowing the nature/description of F and knowing 'y', it is hard to obtain 'x'. This means it is possible to compute the outcome of the function in one direction but it is hard to get back the original input of the function, in spite of knowing the output as well as the function. The present invention's core functionality is explained as below:

The present invention's transformation function, in general, is represented as $$f(x,k,0)=y,k'$$

where 'y' is the output-data, 'x' is the input-data and the constant—zero, represents forward transformation. However, during reverse transformation, the constant is set to one and the output 'y', is taken as input to the function. This process reverses the process of forward transformation and produces the original input-data i.e. f(y, k, 1)=x, k'

As can be seen from above, the same function 'f' is used in the process of forward transformation as well as reverse transformation, and the keyset used is same in both the cases and only change is the change in the indicator value, where the indicator represents the kind of transformation to be carried out. And in both the forward and reverse transformations, the function 'f' is proceeding in one direction only, that is, from k to k' i.e. primary keyset (k) to secondary keyset (k'). And the transformation of k to k' is true one-way process, is same in the forward transformation as well as the reverse transformation.

Case 1: Given the input-data 'x', output-data 'y', the secondary keyset k' and the function it is theoretically extremely difficult and practically impossible to obtain the primary keyset k.

Case 2: Given the output-data 'y' and the function T, it is theoretically and practically impossible to find input-data 'x' and the primary keyset k, since it impossible to choose the right pattern of input-data from the combinations produced.

This embodiment of the present invention is explained in greater detail below. FIG. 1 shows a communications channel 110 and two computing terminals 105 and 115 coupled to the channel. The communications channel may include, for example, a wide area network such as the Internet, a local area network, or a wireless network including base and mobile stations. The computing terminals may comprise, for example, a computer or a hand held device, such as a mobile phone or a personal digital assistant (PDA). In one embodiment of the invention, the technology implemented in the invention can be used to send data securely over a communications channel by using any of the devices listed above.

Figure 2:
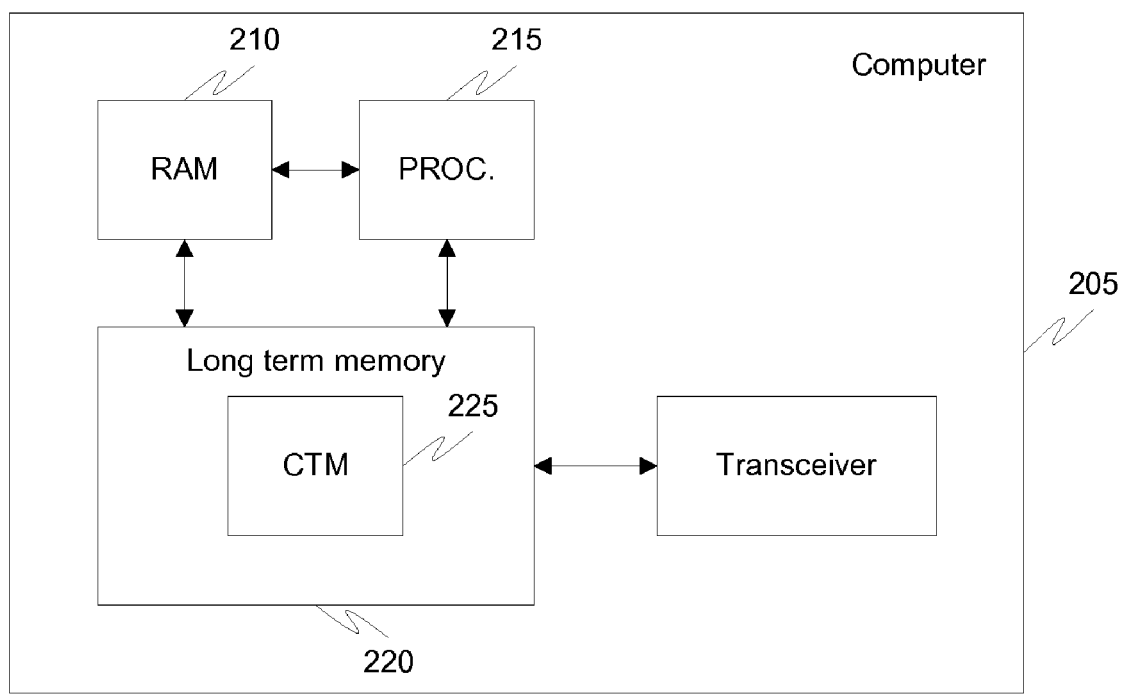
FIG. 2 shows a block diagram of the architecture of the system pursuant to an embodiment of the invention.

FIG. 2 shows the architecture of the invention on computing terminal 205. The invention can be used to send data securely over a communications channel as well as to store data securely on a standalone computer. Each computing terminal comprises a processor readable or a short term memory 210, a processor 215, a long-term memory 220 and a transceiver, each one in communication with the other. The computational transformation module 225 is stored in the long-term memory 220 of the computing terminal 205. The transceiver is used to transmit and receive data from one computing terminal to the other. Data created by any application, for example, a word file or an excel spreadsheet or any data from other applications, is taken in the form of an 'n' bit block of input-data in this embodiment. This data is represented on the computing terminal 205 in the form of bits and bytes. The computational transformation module 225 is responsible for converting the input-data into an output-data in this embodiment of the invention. An output-data is the output received when the input-data is passed through the computational transformation module 225. The output-data is a form of input-data that has been encrypted by performing the forward transformation onto the input-data data into seemingly meaningless data. In one embodiment, this encrypted data can also be stored on the computing terminal 205 to protect data from any misuse or to maintain user privacy. In another embodiment the encrypted data can be sent to another computing terminal. It is sent in an encrypted form to prevent eavesdroppers or other third parties from getting access to the original data. The output-data can be performed upon the process of reverse transformation i.e. decrypted on the other computing terminal to retrieve the original input-data by passing it through the computational transformation module on the receiving computing terminal. Since the embodiment of the invention as a process of encryption and decryption is a symmetric process and if used to send data securely over a communications network 110, the same keyset needs to be present at the sending computer 105 to encrypt the data and the receiving computer 115 to decrypt the data.

Figure 3:
FIG. 3 shows a block diagram of an embodiment of the structure of a keyset.
Figure 3:

In one embodiment, the computational transformation module 225 includes a keyset that is used to encrypt the blocks of input-data. The present invention is an 'n' bit block transformation method, where 'n' is atleast of a length, one bit. As the size 'n' increases, the computing resources such as memory and processor speed that would be required would be more and hence slow down the transformation process. In present day systems, the ideal size for 'n' would be 8 bits. The present invention is capable of transforming each bit of input-data using a different unique keyset. Alternatively, it is also able to encrypt a predetermined number of bits i.e. a block at a time. The input block of the input-data is referred as 'n' bit block and the output block of the output-data is referred as 'm' bit block. For example, the input-data can be converted into 'n' bit blocks of 3 bits and each 'n' bit block can be encrypted using a unique keyset to obtain the 'm' bit block of output-data. The design of the keyset is based on the size of 'n' bit block of input-data used for encrypting the input-data. FIG. 3 shows one embodiment of the keyset where the keyset is a two-dimensional array with two columns and the number of rows is equal to $2^n$ where 'n' represents size in number of bits of input block of the input-data, that is referred as 'n' bit block. As shown in the FIG. 3, the row numbers of the two dimensional array starts from 0 to ($2^n-1$). For example, as shown in FIG. 3, to encrypt a block of 3 bits there would be $2^3$ rows i.e. 8 rows. The first column 305 of the two dimensional array will comprise of unique 'n' bit numbers and is referred to as the Reference column 1 ("Ref1"). Since the keyset shown in the FIG. 3 is used to encrypt a block of 3 bits of input-data, the Ref1 contains the numbers from zero to seven in any order. The second column 310 of the two dimensional array comprises of random numbers and is referred to as the Energy-Value column ("E-Val"). The random numbers can be of any predetermined size of 'v' bits, where 'v' represents the size of the E-Val column in bits. For example, the size of the second column 310 of the keyset shown in the FIG. 3 is 8 bit. In the default state, these random numbers contain numbers range from zero to $2^v$. That is, the largest number the E-Val column can contain is $2^v$ i.e. $2^8=256$, where v=8 bits. The E-Val column of the keyset is then sorted using any sort algorithm. In one embodiment, the numbers in the second column 310 are sorted in a descending or ascending order or any predefined order. In the keyset structure with two columns as shown FIG. 3, the row numbers of the array being unique and in order i.e. zero to seven, is used as another hidden Reference column in the process of transformation. This structure represents one embodiment of the structure of the keyset.

In another embodiment, a two dimensional array with three columns and 2n rows where 'n' represents the size in number of bits in the input block of the input-data is used and is show in FIG. 3. The first column 315 and the second column 320 of the array will comprise of unique $2^n$ bit numbers and are referred to as the Reference Column 1("Ref1") and Reference Column 2("Ref2") respectively and the third column 325 comprises of random numbers and is referred to as the Energy-Value column ("E-Val"). The random numbers can be of any predetermined size of 'v' bits, where 'v' represents the size of the E-Val column in bits. The numbers in the Ref1 and Ref2 columns can be in any order, this adds more complexity to the transformed output-data when compared to the two dimensional array with two column keyset structure. The number of rows in the array is determined by the size of the 'n' bits block of input-data, which in the embodiment depicted by FIG. 3 is $2^3$ equals 8 since 3 is the size of the 'n' bits of input-data. Hence the keyset consists of eight rows.

In another embodiment, the process of transformation, wherein the computational transformation module 225 is input with a 'n' bit block of input-data and an indicator with a value either zero or one. The 'n' bit block of input-data is transformed to a 'm' bit block of output-data using a primary keyset. While this process if accomplished, the primary keyset is transformed to a secondary keyset and the secondary keyset is used for the transformation of the next 'n' bit block of input-data until all the blocks of the input-data are transformed to output blocks of the output-data. An indicator with a value of either zero or one represents whether the computational transformation module 225 needs to perform a forward or reverse transformation. The process of forward and reverse transformation is explained in detail below.

Figure 4:
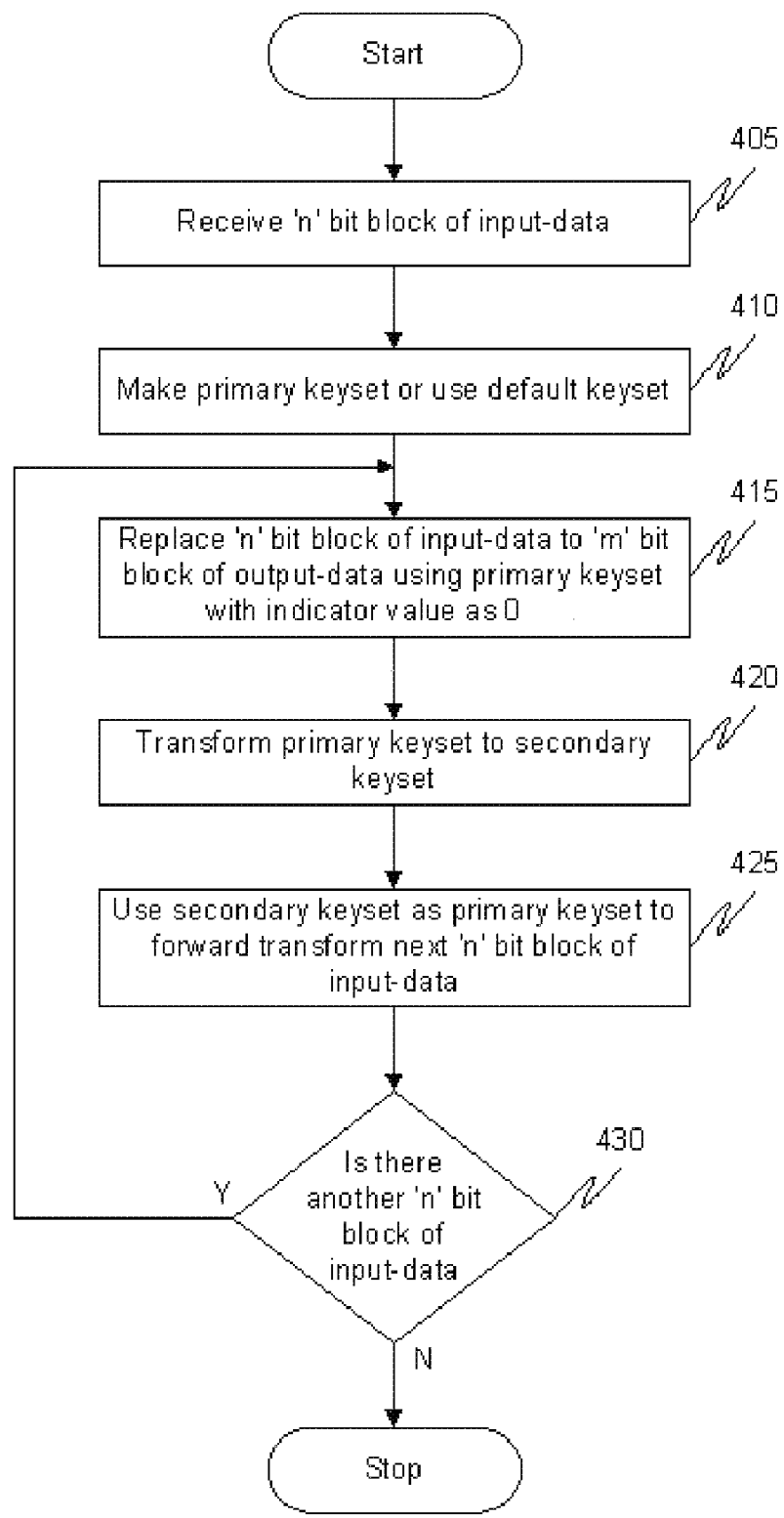
FIG. 4 shows a flow diagram of the steps performed during forward transformation pursuant to an embodiment of the invention.

FIG. 4 shows a flow diagram of the encryption process for converting the input-data to output-data pursuant to an embodiment of the invention. As per one embodiment of the present invention, the process of forward transformation and reverse transformation is carried out using three basic steps, performed with the keyset. An indicator indicates the type of transformation that needs to be carried out. For example, an indicator with a value of zero represents forward transformation and one represents reverse transformation. This when the process of forward transformation has been completed and the output-data transmitted to the receiving computer, the receiving computer would need to reverse the indicator to carry out reverse transformation and retrieve the original input-data. In one embodiment, the indicator can be changed dynamically for every 'n' bit block of input-data. For example, the first 'n' block of input-data can be transformed using the process explained in the forward transformation process while the second 'n' bit block of input data can be transformed using the process explained for the reverse transformation process. However, the same steps would need to be reversed at the receiving computer to retrieve the input-data, that is, for the first 'm' bit block of output-data transformed using reverse transformation and for the second 'm' bit block of output-data transformed using forward transformation. The steps in transformation involved include, ordering, substitution and disordering. These steps can be carried out in any order, for example, substitution, disordering, ordering. However, it should be noted that the same process must be followed at the forward transformation end and the reverse transformation end to retrieve the original data. Every step has been explained in detail below. The embodiment described in the present invention uses substitution, disordering and ordering.

The flow diagram depicting the transformation on the keyset 410, 420, 425 and the conversion of the input-data to output-data 405, 415, 430 is shown in FIG. 4. In the first step 405, the binary equivalent of the input-data is broken down into 'n' bit blocks. The keyset is created in the next step 410 based on the size of the 'n' bit block preferred. For example, if bit-by-bit encryption is desired, the keyset would require $2^1$ that is equal to 2 rows i.e. row 0 and row 1. Since the data or the information is represented using at least 8 bits, the keyset structure can be made with $2^8$ that equals 256 rows i.e. row 0 to row 255 and with either two or three columns. The structure of the two column array and three column array are shown in FIG. 3. However, in the embodiment shown in the diagram, the input block is chosen to be 3 bits and hence the keyset is created with 8 rows and two columns. The first keyset created is referred to as the default keyset and can be a unique keyset for every computing terminal.

Figure 5:
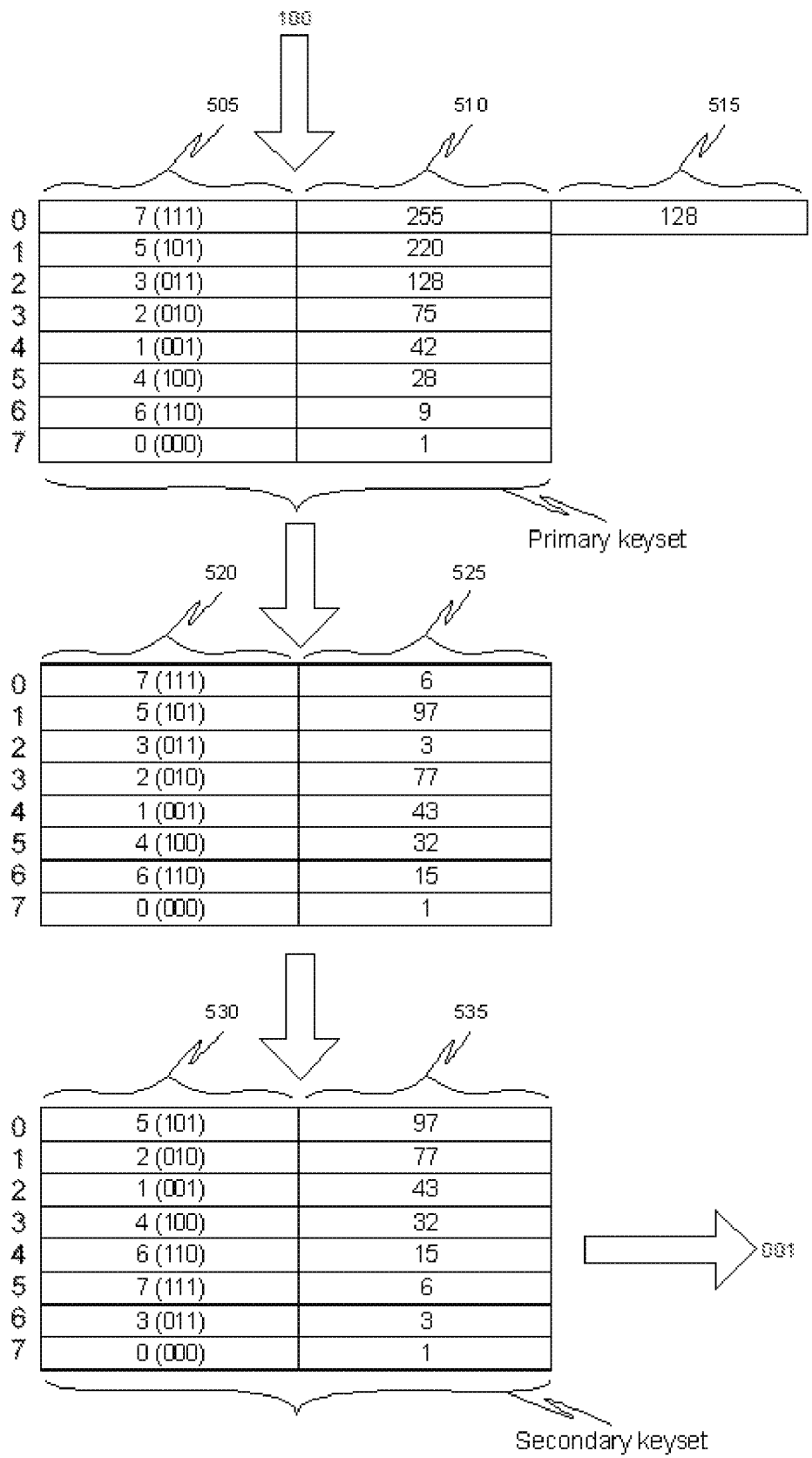
FIG. 5 shows a block diagram of the stages of forward transformations performed on the keyset and the process of transforming the input-data to output-data pursuant to an embodiment of the invention.

In the example illustrated in FIG. 5, the input-data to be encrypted is 100101. Once the input-data has been segregated or broken down into 'n' bit blocks, the first 'n' bit block is selected for encryption. The process of substitution is as follows. In the embodiment depicted in FIG. 5, the first 'n' bit block of input-data is converted into its decimal equivalent and traversing the Ref1 column 505 of the keyset to a row number equal to the decimal equivalent of the 'n' bit block. For example, in the example depicted, the first 'n' bit block of input-data to be encrypted is 100. The decimal equivalent of the 'n' bit block of input-data equals 4. The keyset is traversed to the row number 4 i.e. fifth row of the Ref1 column 505 and the value at the row number 4 of the Ref1 column is selected. As shown in FIG. 5, the number at the row number 4 of the Ref1 is 001. The 'n' bit block of input-data i.e. 100 are replaced with 001, the 001 being the 'm' bit block of output-data. In this process, the first 'n' bit block of input-data is transformed to 'm' bit block of output-data using the default keyset.

As per "Shannon's theory of Perfect Secrecy or Unknown Condition", in order for a cipher to be unbreakable, the keyset required should be unique for every message and the length of the keyset should be equal to or greater than the length of the message. Hence, following Shannon's theory, the keyset is now transformed to a different keyset, using one-way process that is one embodiment of the present invention. The transformed keyset is called the secondary keyset.

The process of the disordering and the ordering are as follows. In one embodiment of the invention, the value of $((2^n/2)-2)$ is calculated, where 'n' represents the size of the 'n' bit block of input-data. In the example show in FIG. 5, the value is $((2^3/2)-2)$ equals 2. In another embodiment, '$((2^n/2)-2)$' can be replaced by any dynamic number for example the decimal equivalent of the preceding 'n' bit block of input-data, or the 'm' bit block of output data, or the exclusive-OR between the 'n' bit block of input-data and 'm' bit block of output-data. This provides for a more dynamic process since the decimal equivalent of the 'n' bit block of input-data and 'm' bit block of output-data can change after every transformation. The E-Val column 510 of the primary keyset is traversed to row number 2. Hence the value at the row number 2 i.e. third row, as shown in FIG. 5 is taken. This value of one hundred and twenty eight as per FIG. 5 becomes the divisor and is stored in a temporary column 515. The number stored at each row of the Ref1 column 505 is added to the number stored in the corresponding row of the E-Val column 510 and the total is referred to as the dividend. For example, the number at the row number 2 of the Ref1 column, i.e. 3, is added to the number stored in the row number 2 of the E-Val column, i.e. 128 and the total, referred to as the dividend, is computed. In one embodiment of the present invention, the modulus between the dividend as well as the divisor is computed i.e. dividend mod divisor which in the example illustrated above would be (3+128) mod 128 which equals 3, and the numbers at each row of the E-Val column 525 are replaced with this number i.e. dividend mod divisor. The final result of 3 replaces the number at the row number 2 of the E-Val column 525. The Ref1 column 520 is unchanged during this transformation. In another embodiment an exclusive-OR or XOR function or any other similar nonlinear function can also be used. Nonlinear functions can be a one or a combination of an arithmetical and logical operation as well such as an addition, multiplication or an exclusive-OR function. For example, the number obtained by computing the divisor XOR dividend can be used to replace the numbers stored at each row of the E-Val column 525, this process is referred as disordering operation. Once the numbers at each row of the E-Val column 525 have been replaced, the entire E-Val column 535 is sorted using any sorting algorithm. Sorting represents one mode of arrangement and the process produces an ordering on the E-Val column. This process is referred as ordering operation. Other means of ordering can also be used. In the preferred embodiment, the column is sorted in descending or ascending order. While performing this sort operation, the Ref1 column 530 is also sorted based on the E-Val column 535. This means that as per the position to which each number in the E-Val column 525 moves, the number at the corresponding Ref1 column 520 is also moved. For example, in FIG. 5 the E-Val column 525 is sorted in descending order and hence the number stored in the row number 2 of the E-Val column 525 moves up to the row number 1. In this process, the number stored in the row number 2 of Ref1 column 520 i.e. 5 also moves to the first row. In this manner, a non-linear sorting is performed on Ref1 column. Those of skill in the art will appreciate that there are ways in which the Ref1 column can be sorted non-linearly or using any mathematical operations and that these other forms of non-linear sort are within the scope of the invention. The new keyset formed by performing these transformations is a unique keyset and is referred to as the secondary keyset 530, 535. This process of transformation on a given keyset to new keyset is truly one-way.

This secondary keyset is used as the primary keyset for the next 'n' bit block of input-data. In the present invention, pursuant to an embodiment of the invention, the second 'n' bit block of input-data is 101. The 'n' bit block of input-data is converted into its decimal equivalent and the Ref1 of the keyset is traversed to the row number corresponding to the decimal equivalent. For example, in the example depicted, the second 'n' bit block of input-data to be encrypted is 101. The decimal equivalent of the 'n' bit block of input-data equals 5. The keyset is traversed to the row number 5 of the Ref1 column 530 i.e. row number marked 5 and the value at the row number 5 of Ref1 is selected. As shown in FIG. 5, the number at the row number 5 of the Ref1 530 is 111. The 'n' bit block of input-data i.e. 101 are replaced with 111, the 111 being the 'm' bit block of output-data. In this process, the second 'n' bit block of input-data is encrypted using the primary keyset.

The keyset is once again transformed using the operations described above to a new secondary keyset and this keyset is once again used as the primary keyset to encrypt the next 'n' bit block of input-data. This process continues till the entire input-data is converted to output-data. In the event that the number of bits in the last block of input-data are less than the size of the previous 'n' bit block of input-data, zeros are added before the bits to make up for the remaining bits. For example, in the example shown in FIG. 5, the size of the 'n' bit block of input-data is 3 bits. However, if the last 'n' bit block of input-data contains only 2 bits, zeros are added before the bits to make up for the missing bits.

The output-data can now be stored on the computing terminal 205 to prevent and to protect the user information or be transmitted to another computing terminal in a secure manner. Any eavesdropper or third party, trying to obtain the data illegally will receive only the output-data. However, without the keyset, he is unable to compute and retrieve the original input-data. In the event that the data is transmitted, the receiving computer terminal must also have the same keyset, used to encrypt the data, to decrypt it.

Figure 6:
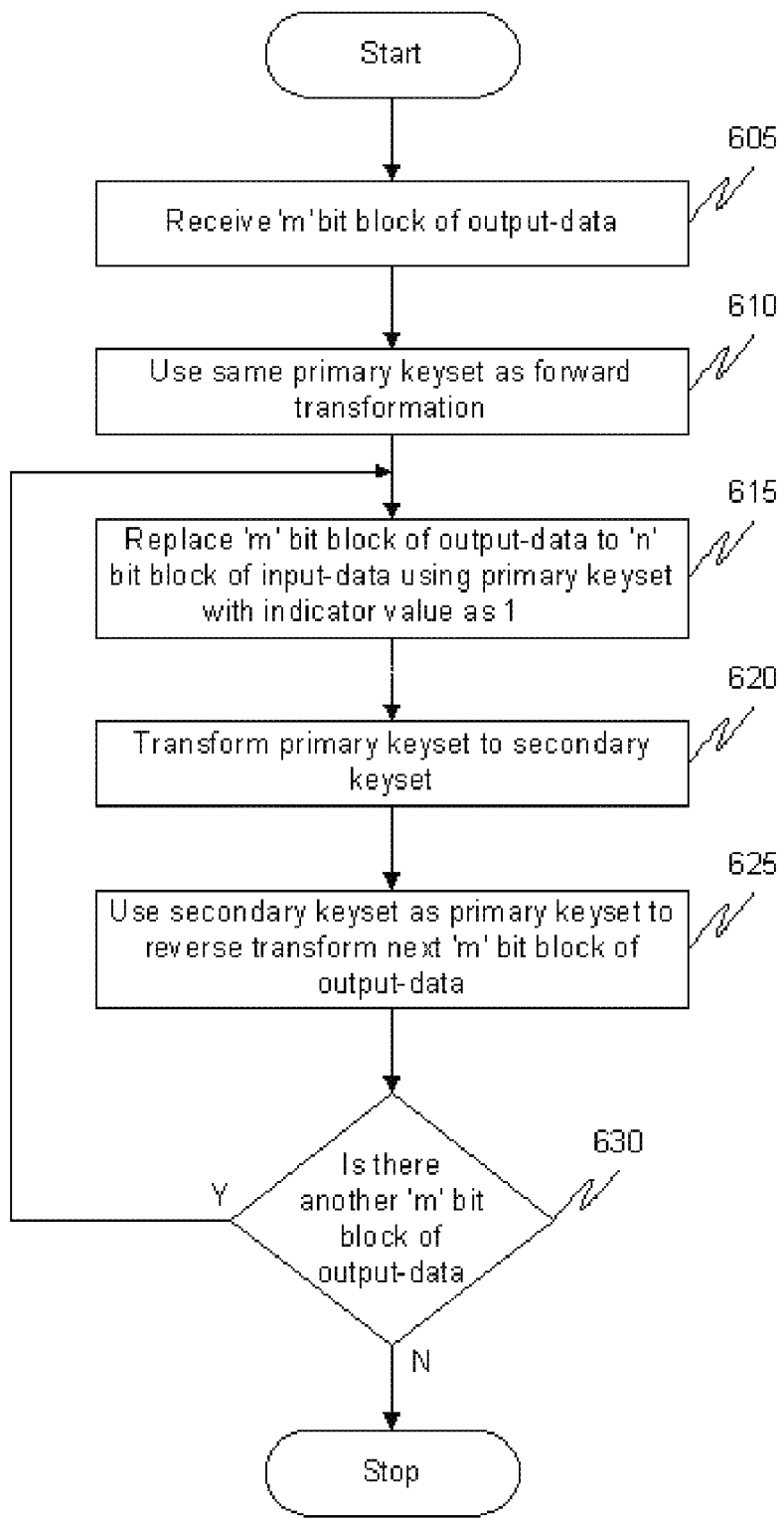
FIG. 6 shows a flow diagram of the steps performed during reverse transformation pursuant to an embodiment of the invention.
Figure 7:
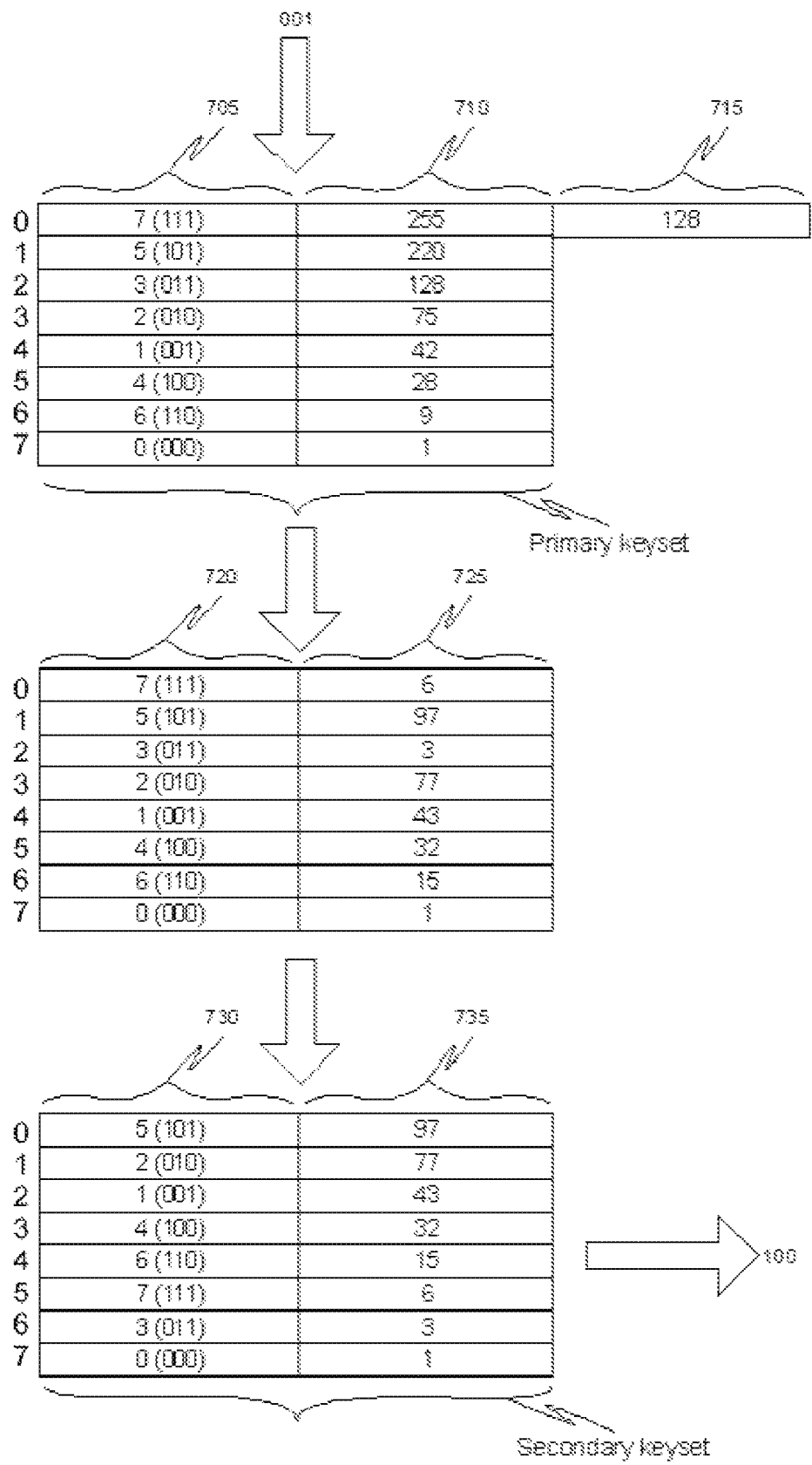
FIG. 7 shows a block diagram of the stages of reverse transformations performed on the keyset and the process of transforming the output-data to input-data pursuant to an embodiment of the invention.

FIG. 6 shows a flow diagram of the reverse transformation process for converting the 'm' bit block of output-data to 'n' bit block of input-data 605, 615, 630 and performing transformations on the primary keyset to convert it into secondary keysets 610, 620, 625 pursuant to an embodiment of the invention. The illustration of the transformation process on the keyset and the conversion of the 'm' bit block of output-data to 'n' bit block of input-data is shown in FIG. 7. In one embodiment, the 'm' bit block of output-data is transmitted through a transceiver over a communications channel 110. The receiving computer is also equipped with an identical default keyset used in the forward transformation process.

In the example illustrated in FIG. 7, the output-data to be transformed are 001111. Once the output-data have been segregated into 'm' bit blocks of output-data, where the 'm' bit blocks of output-data are of the same size as the 'n' bit blocks of input-data used in the forward transformation process, the 'm' bit block of output-data is selected for reverse transformation. For example, the size of the 'n' bit block of input-data in the forward transformation process was 3 and hence the size of the 'm' bit block of output-data in the reverse transformation process shall also be 3.

The 'm' bit block i.e. 001 is searched in the Ref1 column 705. For example, in FIG. 7, the 'm' bit block 001 is at row number 4. The binary equivalent of four i.e. 100 is returned as the 'n' bit block of input-data corresponding to the first 'm' bit block of output-data. This first step determines the 'n' bit block of input-data for the first 'm' bit block of output-data.

Before the next 'm' bit block of output-data is decrypted or transformed, the same transformations that were performed on the keyset during the forward transformation process are carried out again. In the process of transformation, in one embodiment of the invention, the value of $((2^n/2)-2)$ is calculated, where 'n' represents the size of the 'n' bit block of input-data. In the example show in FIG. 7, the value is $((2^3/2)-2)$ equals 2. In another embodiment, '$((2^n/2)-2)$' can be replaced by any dynamic number for example the decimal equivalent of the preceding 'n' bit block of input-data, or the 'm' bit block of output data, or the exclusive-OR between the 'n' bit block of input-data and 'm' bit block of output-data. This provides for a more dynamic process since the decimal equivalent of the 'n' bit block of input-data and 'm' bit block of output-data can change after every transformation. The E-Val column 710 of the primary keyset is traversed to the row number $((2^3/2)-2)$ i.e. row number 2. Hence the value at the row number 2, as shown in FIG. 7 is taken and stored in a temporary column 715. This value of one hundred and twenty eight as per FIG. 7 becomes the divisor. The number stored at each row of the Ref1 705 is added to the number stored in the corresponding row of the E-Val column 710 and the total is referred to as the dividend. For example, the number at the row number 2 of the Ref1 column 705, i.e. 3, is added to the number stored in the row number 2 of the E-Val column 710, i.e. one hundred and twenty eight and the total, referred to as the dividend is computed. In one embodiment of the present invention, the modulus between the dividend as well as the divisor is computed i.e. dividend mod divisor which in the example illustrated above would be (3+128) mod 128 which is 3, and the numbers at each row of the E-Val column 725 are replaced with this number i.e. dividend mod divisor. The final result of 3 replaces the number at the row number 2 of the E-Val column 725. The Ref1 column 720 remains unchanged during this step. In another embodiment as exclusive-OR or XOR function or any other similar function can also be used. Nonlinear functions can be a one or a combination of an arithmetical and logical operation as well such as an addition, multiplication or an exclusive-OR function. For example, the number obtained by computing the divisor XOR dividend can be used to replace the numbers stored at each row of the E-Val column 725. This process is referred as disordering. The disordering operation is same as that of the operation performed in forward transformation. Once the numbers at each row of the E-Val column have been replaced, the entire E-Val column 725 is sorted using any sorting algorithm. Sorting represents one mode of arrangement and the process produces an ordering on the E-Val column. Other means of ordering can also be used. In the preferred embodiment, the column is sorted in descending or ascending order. In the preferred embodiment, the column is sorted in descending or ascending order. The same ordering operation is to be performed as that of the operation performed in forward transformation. While performing this sort operation, the Ref1 column 720 is also sorted based on the E-Val column 725. This means that as per the position to which each number in the E-Val position 725 moves, the number at the corresponding Ref1 720 is also moved. For example, in FIG. 7 the E-Val column 735 is sorted in descending order and hence the number stored in the row number 2 of the E-Val column 735 moves down to the row number 6. In this process, the number stored in the Ref1 720 i.e. 3 also moves to the row number 6. In this manner, a non-linear sort is performed on Ref1 730. Those of skill in the art will appreciate that there are ways in which the Ref1 column can be sorted non-linearly and that these other forms of non-linear arranging operations are within the scope of the invention. The new keyset formed by performing these transformations is a unique keyset and is referred to as the secondary keyset.

This secondary keyset is used as the primary keyset for the next 'm' bit block of output-data. In the present invention, pursuant to an embodiment of the invention, the second 'm' bit block of output-data is 111. A search for this 'm' bit block of output-data is carried out in the Ref1 730. For example, in FIG. 7, the 'm' bit block of output-data 111 is at row number 5. The binary equivalent of five i.e. 101 is the 'n' bit block of input-data. Hence, once this process is completed the output-data of 001111 is transformed to the original input-data of 100101 at the receiving computer using the same algorithm and keyset used in the forward transformation process. This illustrates the mechanism of using the same process in both the encryption and decryption processes with a change in indicator value as shown in FIG. 5 and FIG. 7 respectively.

The keyset is once again transformed using the operations described above to a new secondary keyset and this keyset is once again used as the primary keyset to encrypt the next 'm' bit block of output-data. This process continues till the entire output-data is converted to input-data and the original information is retrieved. In the event that the number of bits in the last block of output-data are less than the size of the previous 'm' bit block of output-data, zeros are added before the bits to make up for the remaining bits.

Figure 8:
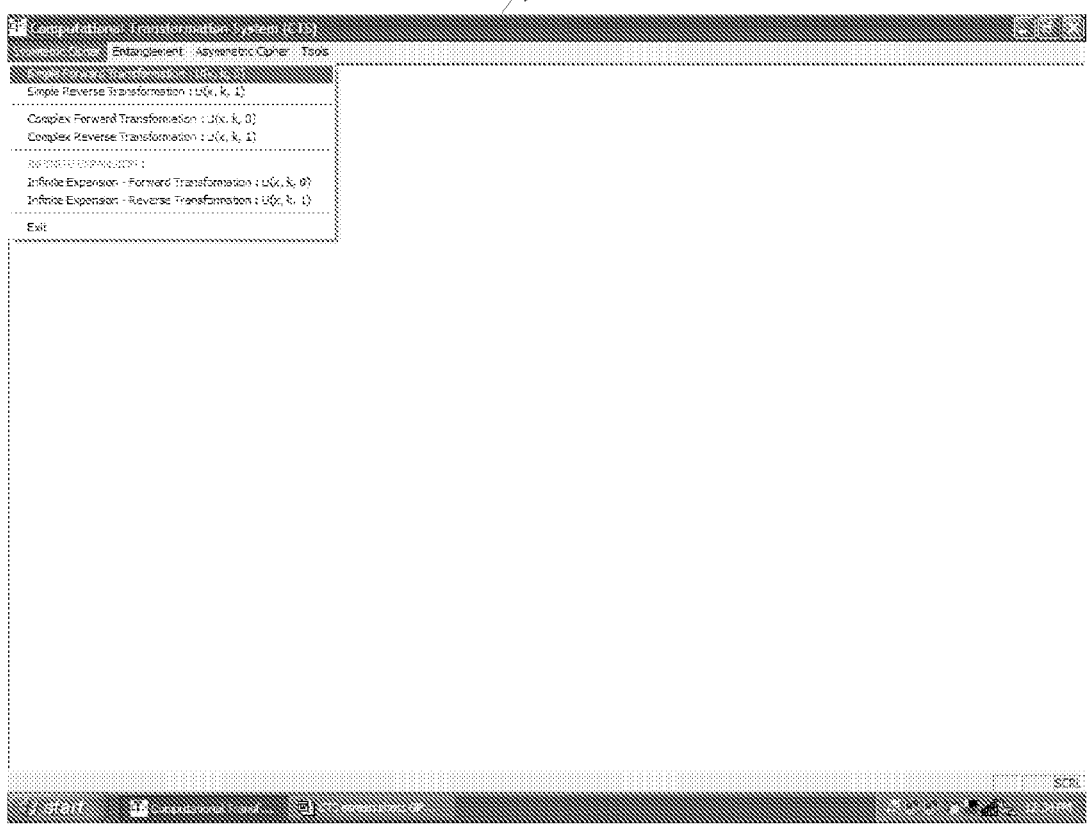
FIG. 8 shows a screenshot of the initiation of the computational transformation process module during the forward transformation process according to one embodiment of the invention.
Figure 9:
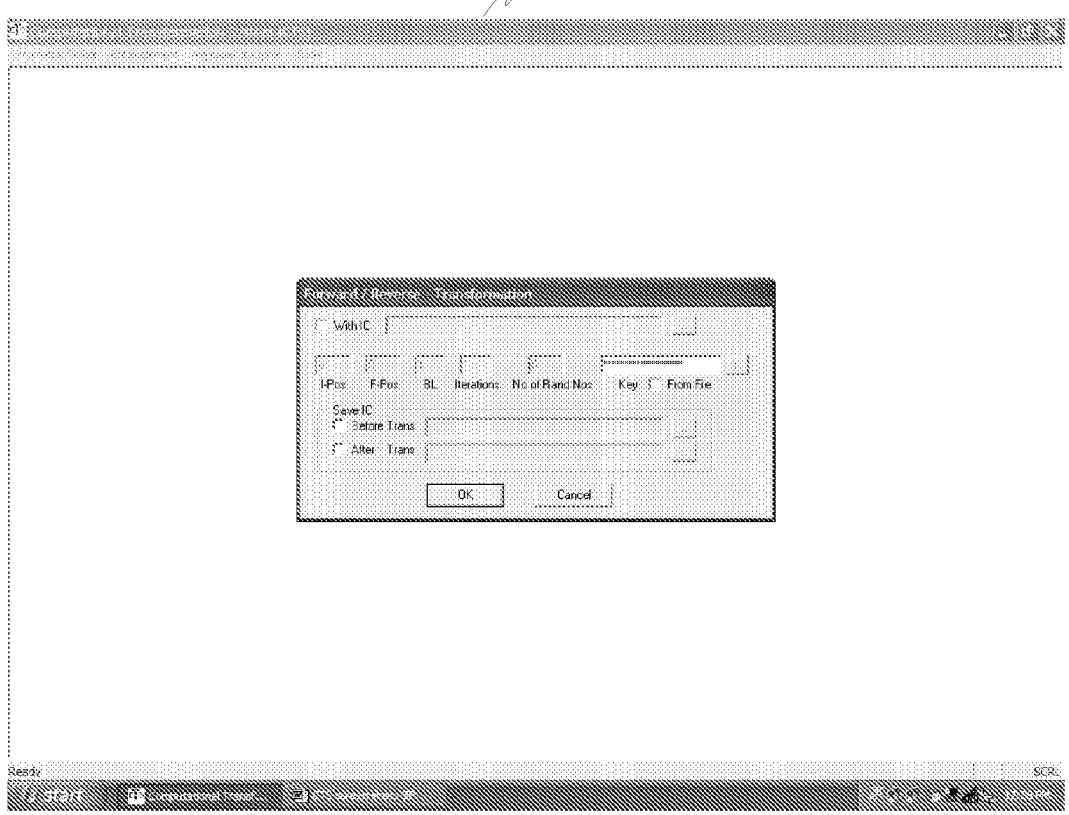
FIG. 9 shows a screenshot of the initial conditions of the computational transformation process module during the forward transformation process according to one embodiment of the invention.
Figure 10:
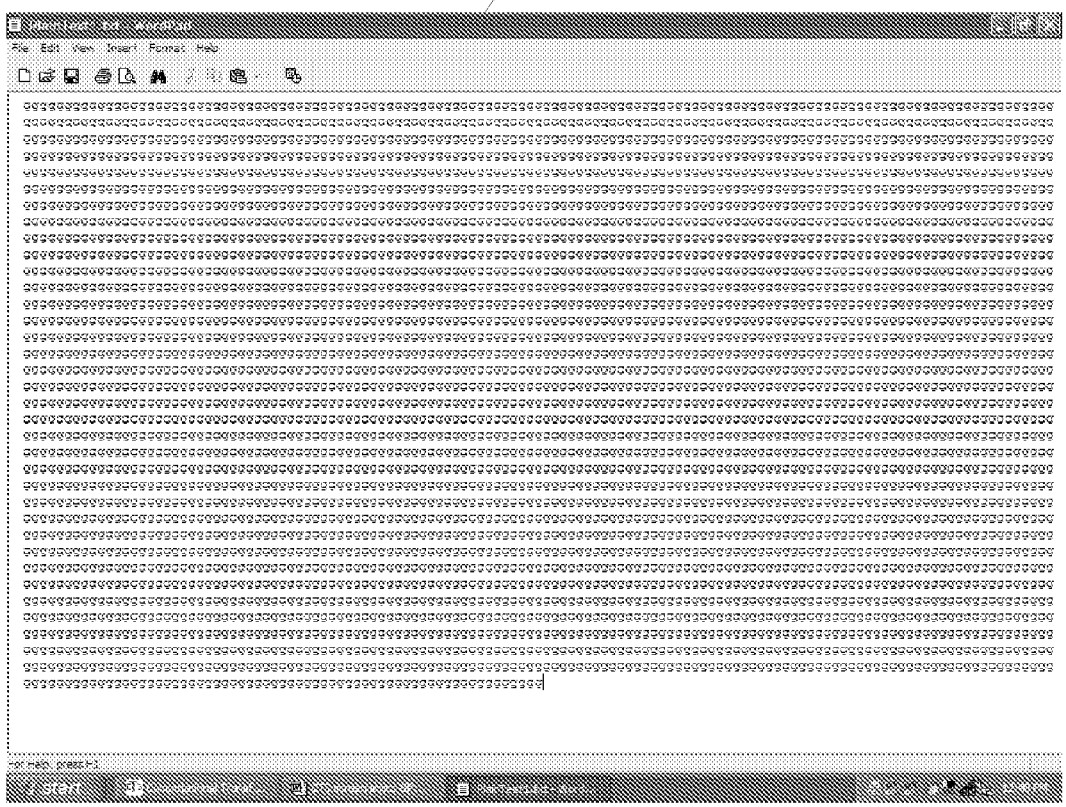
FIG. 10 shows a screenshot of the contents of the input-data into the computational transformation process module during the forward transformation process according to one embodiment of the invention
Figure 11:
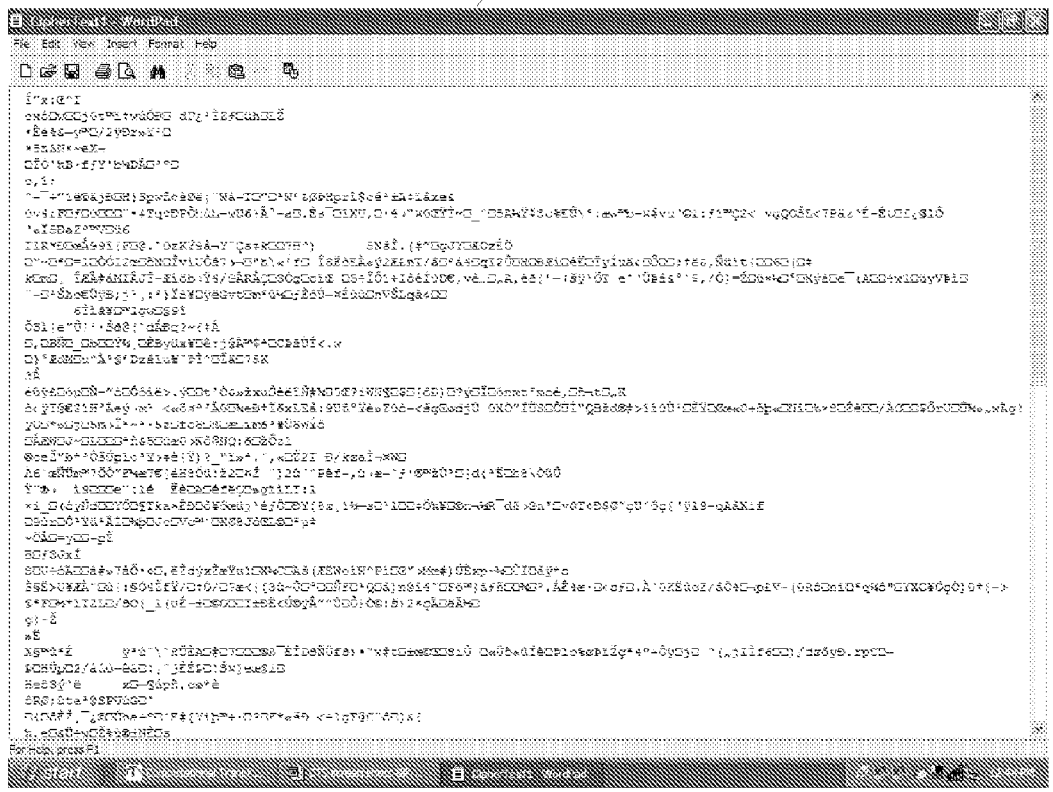
FIG. 11 shows a screenshot of the contents of output-data from the computational transformation process module during the forward transformation process according to one embodiment of the invention.

FIG. 8 to FIG. 11 depicts screenshots of an embodiment of the invention, depicting the implementation of the computational transformation module. The first screenshot 805, FIG. 8, shows the initiation of the forward transformation or the encryption process. FIG. 9 shows the setting of the initial conditions. The parameters 905 shown in the screenshot can be set to add further complexity to the forward transformation process. Some examples of the complexity that can be added include, adding a predetermined number of random numbers to the input-data, performing multiple iterations for each 'n' bit block of input-data etc. Either the default keyset, or a user-defined keyset based on the conditions described above, can be used. As shown in the FIG. 10, the computation transformation module receives the input-data characters. As per FIG. 10 and to test the working of the forward transformation process, a string of the same character, 'g' in the FIG. 10, is input as the input-data 1005 and the computation transformation module performs the forward transformation as described in FIG. 5 and produces an output of output-data 1105 as in FIG. 11. In spite of the input characters being the same i.e. repeating patterns, the output, that is the output-data, is a meaningless or random string of characters. This shows that a new keyset is used for each transformation. The output-data is then sent to the receiving computer.

Figure 12:
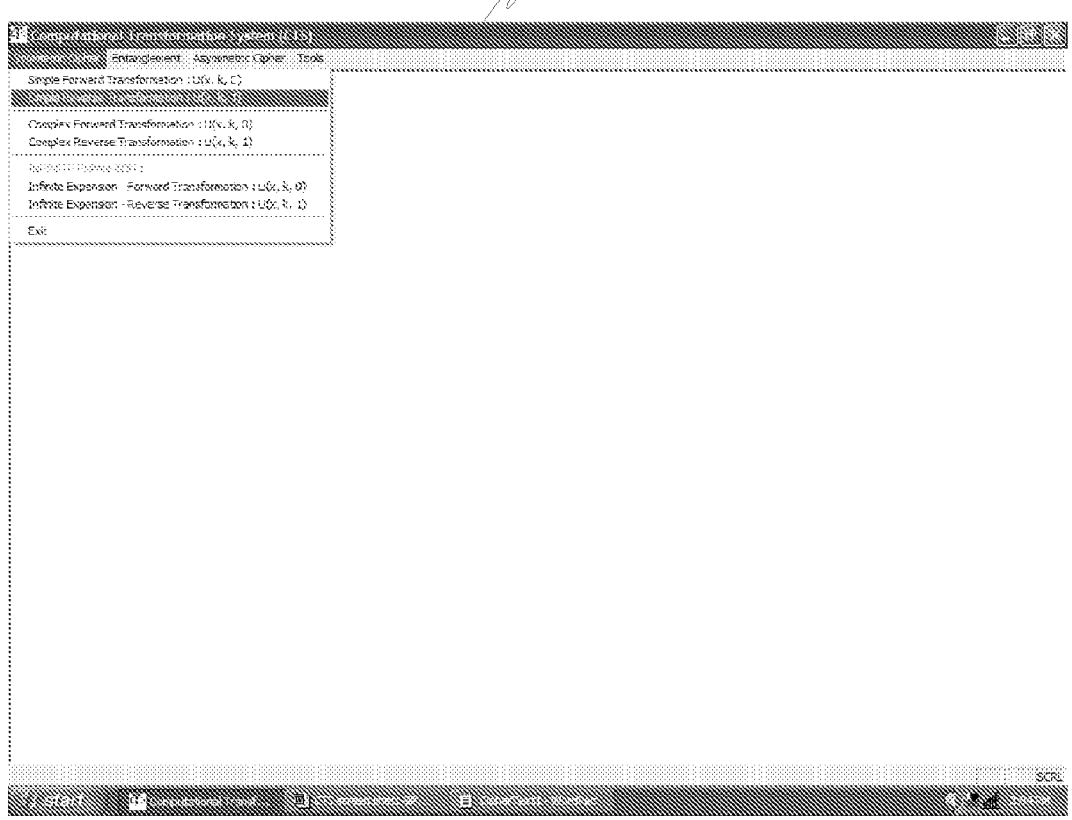
FIG. 12 shows a screenshot of the initiation of the computational transformation process module during the reverse transformation process according to one embodiment of the invention.
Figure 13:
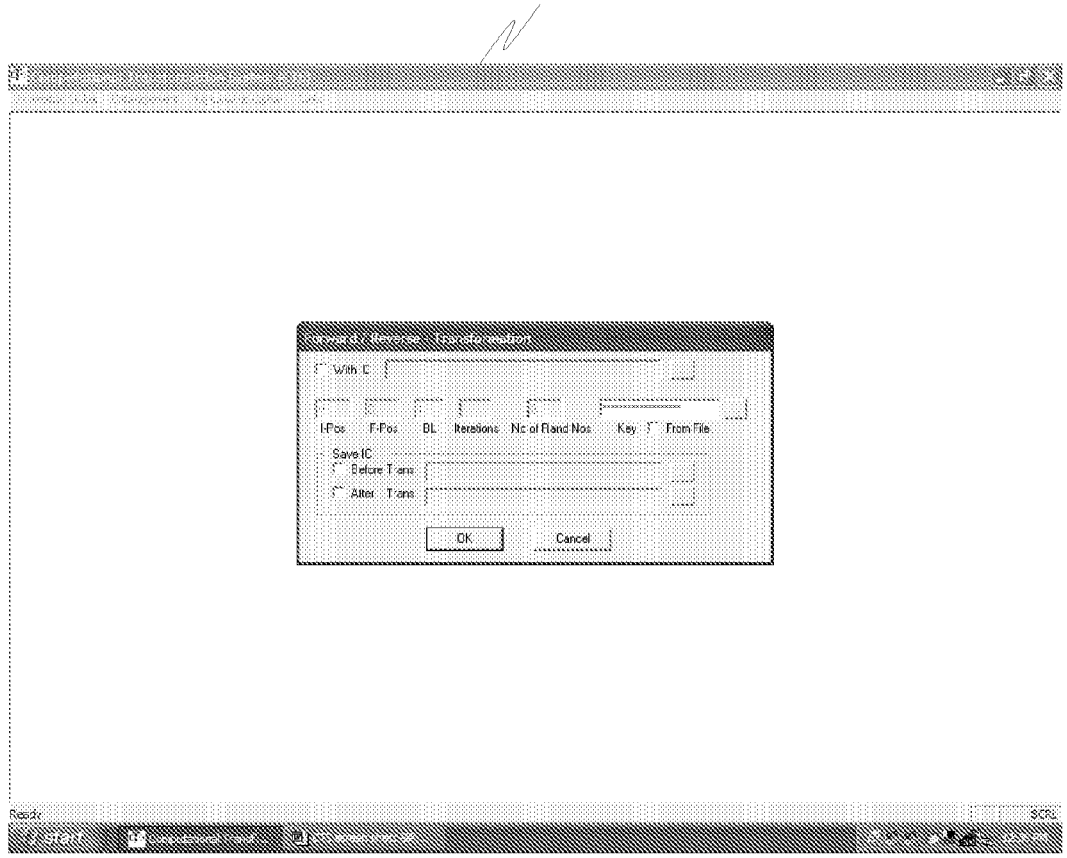
FIG. 13 shows a screenshot of the initial conditions of the computational transformation process module during the reverse transformation process according to one embodiment of the invention.
Figure 14:
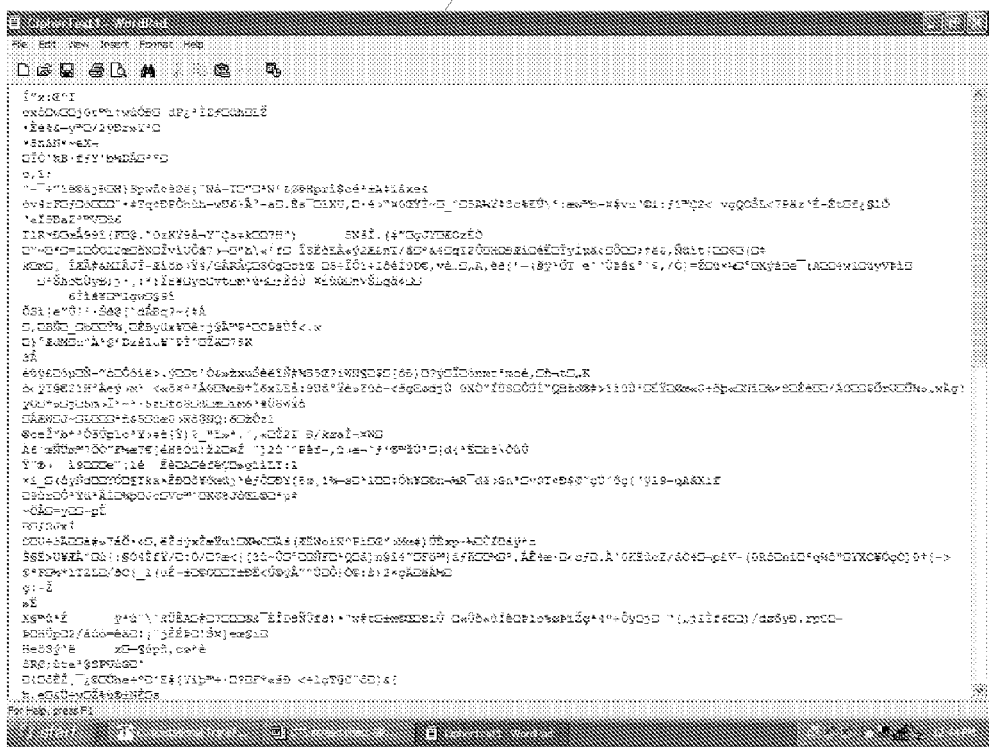
FIG. 14 shows a screenshot of the contents of the output-data into the computational transformation process module during the reverse transformation process according to one embodiment of the invention.
Figure 15:
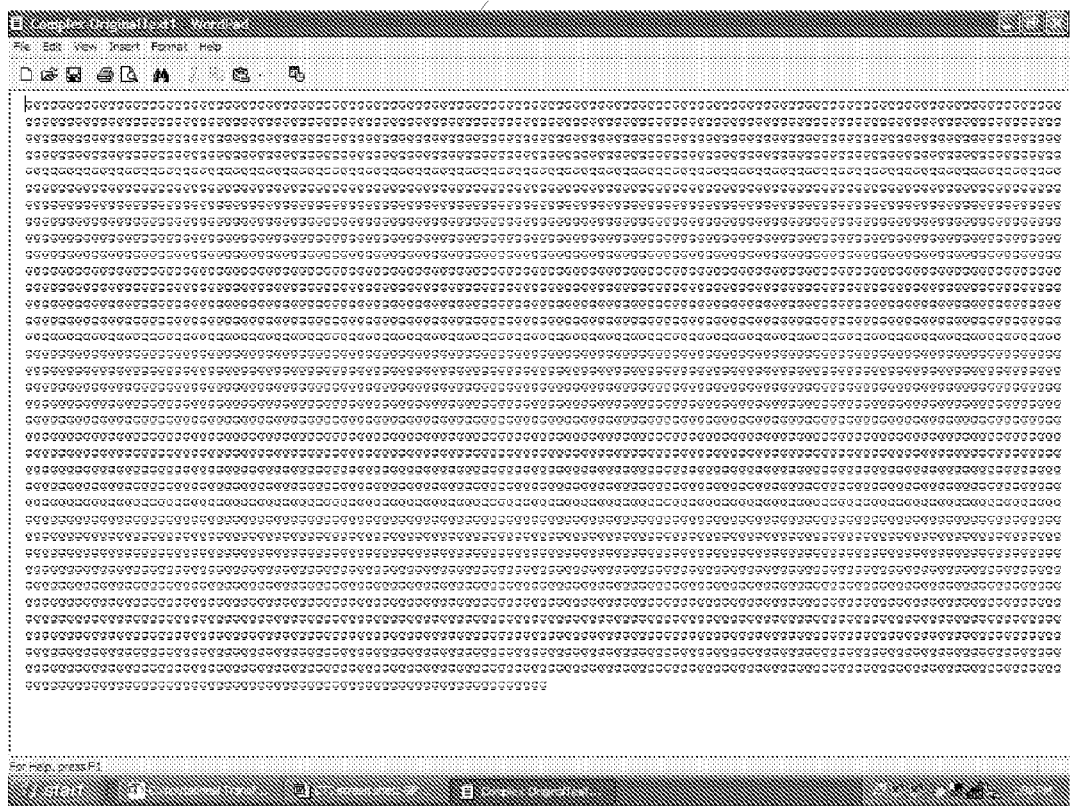
FIG. 15 shows a screenshot of the contents of input-data from the computational transformation process module during the reverse transformation process according to one embodiment of the invention.

FIG. 12 to FIG. 15 depicts screenshots of an embodiment of the invention, depicting the implementation of the computational transformation module in the reverse transformation process. FIG. 12 shows the initiation of the reverse transformation or the decryption process 1205. FIG. 13 shows the setting of the initial conditions 1305. The initial conditions specified must be the same as the conditions used in the forward transformation process and the keyset must also be the same.

There are several initial conditions that can be set and modified to increase complexity. However, it must be noted that the receiving computer must also know the initial conditions to reverse the process to recover the original information. Pursuant to an embodiment of the invention, the examples of the initial conditions as shown in the FIG. 13 are a user specific password that is encrypted as per the encryption procedure described earlier using a system default built-in keyset as the primary keyset. The subsequent secondary keyset that is generated after encrypting the user specific password is used as the primary keyset to encrypt the 'n' bit block of input-data to be converted to 'm' bit block of output-data. The password can be user-defined password or alternatively can also be taken from any file stored in the long-term memory of the system for performing the computational transformation system by selecting the specific option. The keyset for the first block of input-data during encryption and the keyset for the first block of output-data during decryption must be the same, to obtain this, the transformation of user specific password with the default keyset is performed with a same indicator value in both the encryption and the decryption.

In another embodiment, a user-defined number of random numbers can be generated using a third party random number generator or using the process depicted in the present invention, and added to the input-data. The password can be encrypted using the system default keyset as the primary keyset. This enhances the complexity of the transformed output-data. The number of iterations of the computational transformation system for the purpose of encrypting the password and generating the actual primary key can be also be changed. Multiple iterations of transformations on the keyset can be performed before each block of input-data is converted to a block of output-data. The iterations of computational transformation performed on the password can potentially be used as the actual primary key for encryption of the 'n' bit block of input-data. The 'm' bit block of output-data received at the end of the specified number of iterations can be used as the final output-data to be sent to the receiver.

In another embodiment, the transformation of the primary keyset to a secondary keyset can be done using a shuffling mechanism, that is, shuffling the numbers in the first column of the array among themselves i.e. swapping, based on dynamic data i.e. the preceding 'n' bit block of input-data or 'm' bit block of output-data values or both or any dynamic values obtainable during the process of encryption and decryption. In the case of keyset with 3 column structure the shuffling mechanism can be applied on both columns, that is, 'Ref1' and 'Ref2'. This process adds complexity to the transformation of input-data to output-data.

In another embodiment of the system, in order to perform the computational transformation system on the user specific password and make it even more complicated, the user can also append data from a random system file, for example, an executable file or a random data file or any file stored on the long-term memory of the system, to the password. A particular block of data can be taken from the random system file by specifying a location i.e. the initial position and a final position as specified by the user. In another embodiment, a behavioral level number can be specified by the user and the computational transformation can be performed on the password as many times as the behavioral level number specified by the user. This process would generate password specific keyset equal in number to the behavioral level number specified by the user, from the primary system default key. The first 'n' bit block of input-data is then encrypted using a first secondary key obtained from the computational transformation system operation on the user specific password, the 'm' bit block of output-data, as referred to here, obtained by virtue of this operation is then encrypted using the second secondary key obtained from the subsequent operation of the computational transformation system on the user specific password, this process being iterated for as many times as the behavioral level number specified by the user and the final output-data obtained after all these iterations is sent to the recipient. The user can either choose between one or multiple initial conditions described above and are carried out to add complexity to the transformation process and make the forward transformation on the input-data unbreakable. However, the conditions specified in the transformations must also be emulated at the receiving computer to reverse the process of transformation and obtain the original input-data information.

In another embodiment, a predetermined number of blocks can be transformed after performing the computational transformation of each 'n' bit block of input-data. For example, the transformation performed on the password using the default keyset can be saved and this transformed password is transformed again to a new transformed password, overwriting the previous transformed after the transformation of the first 'n' bit block of input-data thereby changing the keyset to a new keyset. This process of transforming the password to a new transformed password and thereby changing the keyset can be repeated after the transformation of each 'n' bit block of input-data. The receiving computer must also have a copy of the password and use the same process of alternating between transforming the 'm' bit block of output-data and transforming the password to change the keyset to retrieve the original input-data.

In another embodiment, the input-data can be expanded to a user-desired size of output-data. For example, the eight bit block of output-data is converted to its decimal equivalent. Each digit of the decimal equivalent is further represented in an eight bit format thereby increasing the size of each eight bit block of output-data by three times. The increased output-data is used as the input-data for the transformation process, the predetermined operation being used at every iteration to produce the desired size of the output-data, the predetermined operation being reversed at the receiving end to retrieve the original input-data. This is done by converting each eight bit block to its decimal equivalent and then representing entire number obtained as an eight bit block of output-data. This process increases the complexity of the transformation process and makes it extremely difficult for an eavesdropper to obtain the information that is transmitted.

In another embodiment of the invention, a constant is assigned a value of either '0' or '1' to identify the transformation process as forward transformation or reverse transformation respectively. Depending on the value of the constant, the system recognizes the transformation to be performed as forward transformation or reverse transformation.

In the event that a user-defined keyset is used, the keyset would need to be exchanged either physically by meeting in person or through other encryption processes such as asymmetric encryption. As shown in the FIG. 14, the computation transformation module receives the output-data 1405 and the computation transformation module performs the reverse transformation as described in FIG. 7 and produces an the input-data 1505 as in FIG. 15. The output-data is the same original input-data used in the forward transformation process.

The computational transformation module uses a true one-way process to perform the forward transformation and reverse transformation process as an embodiment. An eavesdropper is unable to obtain the input-data or the primary keyset for the first block of input-data, even though the output-data and the secondary keyset is known. In one embodiment, the primary keyset can be transferred to the receiving computer using asymmetric encryption techniques already present in available technologies, for example, the RSA algorithm or physically exchanging the keyset in person.

There are several other applications of the computational transformation module. Some of the embodiments of the module showing the various other applications are described below in greater detail.

For example, in another embodiment of the invention, the computational transformation module is used for generating output-data which are random numbers using the one-way process as used in the forward transformation and reverse transformation embodiment. The difference between the computational transformation module used for generating random numbers and the computational transformation module used in forward transformation and reverse transformation process is the use of an irreversible type of computational transformation module for random number generation as compared to a reversible type of computational transformation module used in forward transformation and reverse transformation process.

This embodiment makes use of the default keyset, referred to as the primary keyset in the previous embodiment, to perform an irreversible computational transformation on dynamic parameters of the computing device that is performing the computational transformation. The system parameters are dynamic parameters, some of which change sporadically and some periodically. This helps is making the random number generation truly random. The system parameters are for example, the numerical value of current time taken in seconds, the date on the system, the processor clock speed and other similar parameters.

Each time the process for generating random numbers is initiated, a combination of the system parameters yields a value that is then used as the input-data to the computational transformation module is performed multiple iterations based on the dynamic parameters. For example, each time all the system parameters at a particular instant can be added together to obtain the input-data. A random number is generated based on the size of the input-data i.e. the number of bits.

The process of generating a random numbers from the input-data using the keyset is illustrated in FIG. 5. In the first step, the binary equivalent of the input-data is broken down into 'n' bit blocks of input-data based on the design of the keyset. The keyset is created based on the size of the 'n' bit blocks of input-data preferred. For example, if random numbers need to be created bit by bit, the keyset would require $2^1$ which is 2 rows. However, in the embodiment shown in the diagram, the 'n' bit block is chosen to be 3 bits and hence the keyset is created with 8 rows. The first keyset created is referred to as the default keyset and can be a different unique keyset for every computing terminal.

Once the input-data has been segregated as 'n' bit blocks of input-data, the first 'n' bit blocks of input-data is selected. In the embodiment depicted in FIG. 5, the first 'n' bit blocks of input-data is converted into its decimal equivalent and the Ref1 of the keyset is traversed to the row number corresponding to the decimal equivalent. For example, in the example depicted, the first 'n' bit blocks of input-data is 100. The decimal equivalent of the sub-input block equals 4. The keyset is traversed to the row number 4 of the Ref1 column and the value at the row number 4 of Ref1 column 505 is selected. As shown in FIG. 5, the number at the row number 4 of the Ref1 is 001. The sub-input block i.e. 100 is replaced with 001, where 001 represents an intermediate 'm' bit block of output-data. The next step involves performing a modulus operation between the 'n' bit block of input-data and the value present in the row of the keyset. For example, 100 mod 001 in the case described above. The result i.e. 0 or 000 is obtained and stored as a temporary value. In the next step, the random number generator traverses to the row number 0 the Ref1 column and performs an exclusive-OR or XOR operation between the temporary value and the intermediate 'm' bit block of output-data i.e. 000 XOR 111 which yields 000 is the final output-data. This process continuities till the entire blocks of the input-data in converted to a random blocks of output-data. The output-data is referred to as the random numbers or data and is generated based on a combination of the system parameters as the input-data.

In another application, the invention is used as a hash code generator wherein the computational transformation module can be applied to an input-data in the same manner as described in previous embodiments and the final output-data obtained can act as a hash code. As per one embodiment of the invention, the content for which a hash code needs to be generated is converted to an 'n' bit blocks of input-data and the same process described above is followed to produce an 'm' bit blocks of output-data. The 'm' bit block of output-data is split into two equal halves in the case of an even length of bit string or append a predetermined block if the input-data is made of an odd number of blocks. An exclusive-OR or XOR operation is performed between the two halves until a predetermined number of bits are reached. While dividing the blocks into two equal halves after each XOR operation, the number of blocks is reduced and therefore a predetermined value can be set where this process is terminated. The final output-data is the hash code for the input-data.

In another embodiment, the content for which a hash code needs to be generated is converted to an input-data of blocks and the same process described above is followed to produce an 'm' bit blocks of output-data. However, the difference in this embodiment is that the result of the exclusive-OR operation is stored as an intermediate output and transformed using the computational transformation module to an output-data. The 'm' bit block of output-data is then split into two equal halves in the case of an even length of bit string or append a predetermined block if the input-data is made of an odd number of bits. An exclusive-OR or XOR operation is performed between the two halves until a predetermined number of bits are reached. The result of the exclusive-OR operation yields an intermediate output, which can be used as the input-data for the transformation which is then split again into two equal halves and an exclusive-OR operation is performed on the output-data. At every stage while dividing the bits into two equal halves after each transformation and then transforming the blocks to an output-data using the computational transformation module, the number of bits is reduced and therefore a predetermined value can be set where the iteration process is terminated. The output-data is the hash code for the input-data. This process is slower than the previous embodiment, however, the accuracy of generating unique hash codes is high as compared to the previous embodiment.

What is claimed is:

1. A processor implemented method for cryptographically transforming input-data to output-data, the method comprising:

transforming, by the processor, 'n' bits of received input-data to corresponding 'm' bits of output-data using a current keyset and an indicator, wherein the 'n' bits are used to perform a predefined operation on the current keyset to obtain the 'm' bits, wherein the current keyset is a two dimensional array, and wherein the indicator indicates a forward transformation or a reverse transformation to be performed, wherein the current keyset comprises a two dimensional array type data structure having less than or equal to 2n rows and at least two columns, wherein n is the number of bits in the received 'n' bits of input-data, and wherein a first column of the two-dimensional array comprises unique combination of the received 'n' bits in each of the rows, and wherein a second column comprises values in each of the rows, wherein the values are generated using the n' bits of received input-data and a previous keyset;

transforming, by the processor, each value in the current keyset to form a next keyset using the 'n' bits of received input-data, wherein a first predetermined operation is used for changing values in the current keyset using the 'n' bits of received input-data and a second predetermined operation is used for arranging the changed values in the current keyset to generate the next keyset;

performing the first predetermined-operation on the second column of the current keyset using the 'n' bits of input-data;

performing the second predetermined operation for arranging the second column in a predefined order and in the process, arranging the first column corresponding to the arrangement performed on the second column;

thereby achieving the one-way transformation of the current keyset to the next keyset; and transforming, by the processor, next 'n' bits of the received input-data to a corresponding next 'm' bits of output-data using the next keyset and the indicator.

2. The method of claim 1, wherein the current keyset being a default keyset and can be changed by an user or can be different for every user.

3. The method of claim 2, further comprising:

performing a first transformation of a user defined password of any length and format using the default keyset and in the process converting the default keyset to a password specific keyset and using the password specific keyset as the current keyset for transforming the first 'n' bits of input-data.

4. The method of claim 3, wherein the transformation of the user defined password can be carried out over multiple iterations.

5. The method of claim 3, wherein the transformation is performed on the user defined password for a user defined number of behavioral levels, where the user defined number of behavioral levels generates the password specific keysets, the password specific keysets being stored in memory.

6. The method of claim 5, wherein the transformation of input-data to output-data is performed using the password specific keysets in a predetermined order.

7. The method of claim 6, wherein the predetermined order is the order in which the password specific keysets are generated and stored.

8. The method of claim 1, wherein the indicator can dynamically change after transforming each 'n' bits of input-data in a predetermined manner in transforming the received 'n' bits.

9. The method of claim 1, wherein the processor implemented method for cryptographically transforming input-data to output-data, can be used to send a transformed data securely over a communications network from a transmitting end, wherein the transformed data being transformed back at a receiving end to retrieve back the input-data, wherein the receiving end being equipped with the same current keyset and with a change in the indicator, and wherein the receiving end performs the same transformations on the current keyset as at the transmitting end.

10. The method of claim 9, wherein a data from a first location to a second location from a predetermined file can be appended to the password, a copy of the predetermined file being present at the receiving computer.

11. The method of claim 1, wherein the random numbers in the second column can be of any predetermined size in bits.

12. The method of claim 1, wherein transforming the received 'n' bits with the indicator representing forward transformation comprises:
   a. traversing the first column of the current keyset to a row number equal to a decimal equivalent of the 'n' bits of received input-data,
   b. reading the 'm' bits stored at the row of the first column, and
   c. replacing the 'n' bits with the 'm' bits, and wherein transforming the received 'n' bits with the indicator representing reverse transformation comprises:
   d. searching the first column of the current keyset for the 'n' bits;
   e. locating the 'n' bits at a row in the first column of the current keyset;
   f. reading the row number and representing the row number in 'm' bits; and
   g. replacing the 'n' bits with the 'm' bits.

13. The method of claim 12, wherein each of the steps a to c or d to g can be performed for a predetermined number of times where a plurality of intermediate output bits generated are used as input bits for subsequent iteration until the predetermined number of times has been accomplished.

14. The method of claim 12, wherein the steps performed for forward transformation and reverse transformation can be worked interchangeably.

15. The method of claim 12, wherein in transforming the current keyset to the next keyset, the method further comprises:
   changing the values in each row of the first column based on a predetermined operation.

16. The method of claim 12, wherein the forward or reverse transformation process could be implemented to generate hash code numbers, the process further comprises:
   a. splitting the output-data into two halves, a first half and a second half;
   b. performing an exclusive-OR operation between the first half and the second half, the exclusive-OR operation producing an intermediate output; and
   c. performing steps a to b till a predetermined bit string length is reached whereby a final result is the unique hash code.

17. The method of claim 12, wherein the forward or reverse transformation process could be implemented to generate hash code numbers, the process further comprises:
   a. splitting the output-data into two halves, a first half and a second half;
   b. performing an exclusive-OR operation between the first half and the second half, the exclusive-OR operation producing an intermediate output;
   c. using the intermediate output as input-data for the transformation process to produce the output-data; and
   d. performing steps a to c till a predetermined bit string length is reached whereby a final result is the unique hash code.

18. The method of claim 12, wherein the forward or reverse transformation can be performed on a predetermined number of blocks of 'n' bits and then transform the current keyset to the next keyset for transforming a next 'n' bits of input-data.

19. The method of claim 1, wherein the steps of performing the first predetermined operation and the second predetermined operation can be repeated a predetermined number of times with a different set of first predetermined operations and second predetermined operations before receiving the next 'n' bits.

20. The method of claim 1, wherein the first predetermined operation can be a one or a combination of an arithmetic or a logical operation selected from: a modulus operation, an exclusive-OR operation, an addition operation and a multiplication operation.

21. The method of claim 1, wherein the second predetermined operation includes sorting in ascending, descending or any predetermined ordering.

22. The method of claim 1, wherein multiple iterations of transformations can be performed on each 'n' bits of the input-data, using one or more keysets.

23. The method of claim 1, wherein a predetermined operation can be performed on the output-data to increase the size in bits of the output-data, the increased output-data is used as the input-data for the transformation process, the predetermined operation being used at every iteration to produce the desired size of the output-data, the predetermined operation being reversed at the receiving end to retrieve the original input-data.

24. The method of claim 1, wherein a predetermined number of random numbers can be added to the input-data.

25. A cryptographic transformation system for cryptographically transforming input-data to output-data, comprising: a processor; a memory coupled to the processor, where the memory includes a computational transformation module having instructions that, when executed by the processor cause the processor to perform all of the steps, comprising;
   transforming, by the processor, 'n' bits of received input-data to corresponding 'm' bits of output-data-using a current keyset and an indicator, wherein the 'n' bits are used to perform a predefined operation on the current keyset to obtain the 'm' bits, wherein the current keyset is a two dimensional array and wherein the indicator indicates a forward transformation or a reverse transformation to be performed, wherein the current keyset comprises a two dimensional array type data structure having less than or equal to 2n rows and at least two columns, wherein n is the number of bits in the received 'n' bits of input-data, and wherein a first column of the two-dimensional array comprises unique combination of the received 'n' bits in each of the rows, and wherein a second column comprises values in each of the rows, wherein the values are generated using the n' bits of received input-data and a previous keyset;

transforming, by the processor, each value in the current keyset to form a next keyset using the 'n' bits of received input-data, wherein a first predetermined operation is used for changing values in the current keyset using the 'n' bits of received input-data and a second predetermined operation is used for arranging the changed values in the current keyset to generate the next keyset;

perform the first predetermined operation on the second column of the current keyset using the 'n' bits of received input-data, the computational transformation module, in conjunction with the processor, performs the second predetermined operation on the second column of the current keyset which results in an ordering being performed on the first column of the current keyset; and transforming, by the processor, next 'n' bits of the received input-data to a corresponding 'm' bits of output-data using the next keyset and the indicator.

26. The system of claim 25, wherein the cryptographic transformation, can be used to send a transformed data securely over a communications network from a transmitting end, wherein the transformed data being transformed back at a receiving end to retrieve back the input-data, wherein the receiving end being equipped with the current keyset and with a change in the indicator, and performs the same transformations on the current keyset as at the transmitting end.

27. The system of claim 26, wherein a data from a first location to a second location from a predetermined file can be appended to the password, a copy of the file being present at the receiving computer.

28. The system of claim 25, wherein the indicator can change dynamically in a predetermined manner in transforming the received 'n' bits.

29. The system of claim 25, wherein the random numbers in the second column can be of a predetermined size.

30. The system of claim 25, wherein the processor is further configured in the case of the forward transformation to:
traverse the first column of the current keyset to a row number equal to a decimal equivalent of the 'n' bits of received input-data; and
reading the 'm' bits stored at the row and thereafter replacing the 'n' bits of the input-data with the 'm' bits as the output-data in the case of forward transformation; and further configured in case of the reverse transformation to:
search the first column of the current keyset for the 'n' bits;
locate the 'n' bits at a row in the first column of the current keyset;
read the row number and represent the row number in 'm' bits; and
replace the 'n' bits with the 'm' bits.

31. The system of claim 30, wherein each of the forward transformation or the reverse transformation can be performed a predetermined number of times where a plurality of intermediate output bits generated are used as input-data for subsequent iteration until, the predetermined number of times has been accomplished.

32. The system of claim 30, wherein the forward or reverse transformation can be performed on a predetermined number of blocks of 'n' bits and then transform the current keyset to the next keyset for transforming a next 'n' bits of input-data.

33. The system of claim 25, wherein a shuffling of numbers in the first column among themselves can be performed based on a predetermined operation.

34. The system of claim 25, wherein the first predetermined operation can be one or a combination of an arithmetical and logical operation selected from: a modulus operation, an exclusive-OR operation, an addition operation and a multiplication operation.

35. The system of claim 25, wherein the second predetermined operation includes an ascending sort, a descending sort, or any predetermined ordering.

36. The system of claim 25, further configured to perform a first transformation on a user defined password of any length and format using the current keyset and in the process converting the current keyset to a password specific keyset and using the password specific keyset as the current keyset for transforming the input-data.

37. The system of claim 36, wherein the transformation of the user defined password can be carried out over multiple iterations.

38. The system of claim 36, wherein the transformation is performed on the user defined password for a user defined number of behavioral levels, where the user defined number of behavioral levels generates the password specific keysets.

39. The system of claim 38, wherein the output-data is obtained from the input-data by performing the transformation process on the input-data using at least one of the password specific keysets generated, the password specific keysets being stored in the memory and used in a predetermined order.

40. The system of claim 39, wherein the predetermined order is the order in which the password specific keysets are generated and stored.

41. The system of claim 40, wherein the plurality of password specific keysets generated by performing the transformation are stored in the memory.

42. The system of claim 25, wherein multiple predetermined operations can be performed on one or more keysets before transforming the input-data to the output-data.

43. The system of claim 25, wherein a predetermined operation can be performed on the output-data to increase the size in bits of the output-data, the increased output-data is used as the input-data for the transformation process, the predetermined operation being used at every iteration to produce the desired size of the output-data, the predetermined operation being reversed at the receiving end to retrieve the original input-data.

44. The system of claim 25, wherein a predetermined number of random numbers can be added to the input-data.

45. A non-transitory computer readable storage medium having instructions, which when executed by a computer, causes the computer to perform a method of cryptographically transforming input-data to output-data, the method comprising:
transforming, by the processor, 'n' bits of received input-data to corresponding 'm' bits of output-data using a current keyset and an indicator, wherein the 'n' bits are used to perform a predefined operation on the current keyset to obtain the 'm' bits, wherein the current keyset is a two dimensional array and wherein the indicator indicates a forward transformation or a reverse transformation based to be performed, wherein the current keyset comprises a two dimensional array type data structure having less than or equal to 2n rows and at least two columns, wherein n is the number of bits in the received 'n' bits of input-data, and wherein a first column of the two-dimensional array comprises unique combination of the received 'n' bits in each of the rows, and wherein a second column comprises values in each of the rows, wherein the values are generated using the n' bits of received input-data and a previous keyset;

transforming, by the processor, each value in the current keyset to form a next keyset using the 'n' bits of received input-data, wherein a first predetermined operation is used for changing values in the current keyset using the 'n' bits of received input-data and a second predetermined operation is used for arranging the changed values in the current keyset to generate the next keyset;

performing the first predetermined operation on the second column of the current keyset using the 'n' bits of input-data;

performing the second predetermined operation for arranging the second column in a predefined order and in the process arranging the first column corresponding to the arrangement performed in the second column, and transforming, by the processor, next 'n' bits of the received input-data to corresponding next 'm' bits of output-data using the next keyset and the indicator.

46. A processor implemented method of cryptographic transformation of input-data to output-data for generating a set of random numbers, the method comprising:

irreversibly transforming, by the processor, 'n' bits of received input-data to 'm' bits of output-data using a current keyset and an indicator, wherein the 'n' bits of received input-data are used to perform a predefined irreversible operation on the current keyset to obtain the 'm' bits of output-data, wherein the current keyset is a two dimensional array, and wherein the indicator indicates a forward transformation or a reverse transformation to be performed, wherein the current keyset comprises a two dimensional array type data structure having less than or equal to $2^n$ rows and at least two columns, wherein n is the number of bits in the received 'n' bits of input-data, and wherein a first column of the two-dimensional array comprises unique combination of the received 'n' bits in each of the rows, and wherein a second column comprises values in each of the rows, wherein the values are generated using the n' bits of received input-data and a previous keyset;

transforming, by the processor, each value in the current keyset to form a next keyset using the 'n' bits of received input-data, wherein a first predetermined operation is used for changing values in the current keyset using the 'n' bits of received input-data and a second predetermined operation is used for arranging the changed values in the current keyset to generate the next keyset;

performing the first predetermined operation on the second column of the current keyset using the 'n' bits of input-data;

performing the second predetermined operation for arranging the second column in a predefined order and in the process arranging the first column corresponding to the arrangement performed in the second column; and transforming, by the processor, next 'n' bits of the received input-data to a corresponding next 'm' bits of output-data using the next keyset and the indicator.

47. The method of claim 46, wherein irreversibly transforming the 'n' bits of input-data to the 'm' bits of output-data using the predefined irreversible operation, comprises:

traversing to a row number equivalent to a decimal equivalent of the 'n' bits of the input-data in a first column of the current keyset;

determining the 'm' bits stored at the row number in the first column of the current keyset;

performing a modulus operation between the 'n' bits and the 'm' bits, the result being stored as a first temporary value;

traversing to a row number equivalent to a decimal equivalent of the temporary value in the first column of the current keyset;

determining the number stored at the row number; and performing an exclusive-OR operation between the 'm' bits and the determined number to generate the 'm' bits of output-data.

48. The method of claim 47, wherein the first predetermined operation comprises at least one of an arithmetic or a logical operation selected from: a modulus operation, an exclusive-OR operation, an addition operation and a multiplication operation; and wherein the second predetermined operation includes sorting in ascending, descending or any predefined ordering.

49. The method of claim 46, wherein the indicator dynamically changes after transforming each 'n' bits of input-data using the 'n' bits in a predetermined manner; and wherein a predetermined operation can be performed on the output-data to increase the size in bits of the output-data, the increased output-data is used as the input-data for the transformation process, the predetermined operation being used at every iteration to produce the desired size of the output-data.

* * * * *